(12) United States Patent
Hamabe et al.

(10) Patent No.: US 12,275,304 B2
(45) Date of Patent: Apr. 15, 2025

(54) IMAGE DISPLAY CONTROL DEVICE, IMAGE DISPLAY CONTROL METHOD, AND COMPUTER-READABLE STORAGE MEDIUM

(71) Applicant: TOYOTA JIDOSHA KABUSHIKI KAISHA, Toyota (JP)

(72) Inventors: Ryota Hamabe, Nisshin (JP); Keigo Hori, Toyota (JP); Takahiro Hirota, Nukata-gun (JP); Yoshinori Murata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 153 days.

(21) Appl. No.: 17/888,234

(22) Filed: Aug. 15, 2022

(65) Prior Publication Data
US 2023/0069560 A1 Mar. 2, 2023

(30) Foreign Application Priority Data
Aug. 30, 2021 (JP) .................................. 2021-140173

(51) Int. Cl.
*B60K 35/00* (2024.01)
*B60K 35/10* (2024.01)
(Continued)

(52) U.S. Cl.
CPC .............. *B60K 35/00* (2013.01); *B60K 35/10* (2024.01); *B60K 35/28* (2024.01); *B60K 35/60* (2024.01); *B60K 35/81* (2024.01); *B60K 2360/1446* (2024.01); *B60K 2360/168* (2024.01); *B60K 2360/782* (2024.01); *B60K 2360/785* (2024.01)

(58) Field of Classification Search
CPC ........ B60K 35/00; B60K 35/10; B60K 35/28; B60K 35/60; B60K 35/81; B60K 2360/1446; B60K 2360/168; B60K 2360/782; B60K 2360/785; B60K 35/23; B60K 2360/115; B60K 2360/119
See application file for complete search history.

(56) References Cited

U.S. PATENT DOCUMENTS

2006/0259210 A1 * 11/2006 Tanaka ................... G02B 27/01
701/1
2010/0238516 A1 * 9/2010 Ito ......................... H04N 1/3878
358/448

FOREIGN PATENT DOCUMENTS

| JP | H10297392 A | * 11/1998 |
| JP | 2010-226213 A | 10/2010 |
| JP | 2013-254330 A | 12/2013 |

OTHER PUBLICATIONS

Machine Translation of JPH10297392A (Year: 1998).*

* cited by examiner

*Primary Examiner* — Sahar Motazedi
(74) *Attorney, Agent, or Firm* — Oliff PLC

(57) ABSTRACT

In a display control device, in a case in which a total number of image pages displayable at a meter display is equal to or less than a predetermined value, the display control device displays a same number of dots as the total number of image pages, and displays a page indicator that specifies a dot corresponding to the displayed image page. Further, in a case in which the total number of image pages exceeds the predetermined value, a page indicator is displayed in which a cursor is arranged at a position corresponding to the displayed image page together with a scroll bar. As a result, even if the total number of image pages is large, the display of the page indicator is not complicated.

6 Claims, 7 Drawing Sheets

(51) Int. Cl.
*B60K 35/28* (2024.01)
*B60K 35/60* (2024.01)
*B60K 35/81* (2024.01)

IMAGE DISPLAY CONTROL DEVICE, IMAGE DISPLAY CONTROL METHOD, AND COMPUTER-READABLE STORAGE MEDIUM

CROSS-REFERENCE TO RELATED APPLICATION

This application is based on and claims priority under 35 USC § 119 from Japanese Patent Application No. 2021-140173 filed on Aug. 30, 2021, the disclosure of which is incorporated by reference herein.

TECHNICAL FIELD

The present disclosure relates to an image display control device, an image display control method, and a computer-readable storage medium storing an image display control program.

RELATED ART

Japanese Patent Application Laid-Open (JP-A) No. 2013-254330 (Patent Document 1) discloses a vehicle information display device that creates an image from information provided to a vehicle and displays the image at a display. The vehicle information display device is provided with icons, below a multi-display for displaying various information, for each attribute of information for selecting a main image to be displayed at the multi-display, and by selecting the icons, a main screen displayed at the multi-display can be selected.

In the vehicle information display device of Patent Document 1, an icon is added by adding an attribute. Moreover, in the vehicle information display device, when new information is added to any attribute, display is performed indicating that new information has been added to an icon for that attribute, and therefore, improvement in the complexity of displaying in order to understand the total number of image pages displayed at the display or the position of the displayed image page is undoubtedly desired.

SUMMARY

The present disclosure has been accomplished in consideration of the above facts, and an object of the present disclosure is to provide an image display control device, an image display control method, and a computer-readable storage medium storing an image display control program, which can prevent the total number of image pages displayed at a display or display for understanding a position of a displayed image page from becoming complicated.

An image display control device according to a first aspect includes: a control section configured to cause any image page among plural displayable image pages to be displayed at a display, such that: in a case in which a total number of the plural displayable image pages is equal to or less than a predetermined value, the control section causes display of a same number of first symbols as the total number of the plural displayable image pages, and causes display of a first page indicator that specifies which first symbol among the first symbols is at a page position corresponding to an image page displayed at the display; and in a case in which the total number of the plural displayable image pages exceeds the predetermined value, the control section causes display of a strip-shaped second symbol, and causes display of a second page indicator that specifies, on the second symbol, a page position of an image page displayed at the display, with respect to the total number of the plural displayable images.

In the image display control device according to the first aspect, any image page among the plural image pages displayable at a display is displayed at the display. Further, the control section displays a page indicator in order to specify the total number of the plural image pages displayable at the display and the relative position of the displayed image page with respect to the total number of the plural displayable image pages.

In a case in which the total number of the plural displayable image pages is equal to or less than the predetermined value, the control section causes display of the same number of first symbols as the total number of the plural displayable image pages, and also causes display of a first page indicator that specifies which first symbol among the first symbols is at a page position corresponding to an image page displayed at the display. In a case in which the total number of the plural displayable image pages is equal to or less than the predetermined value, the total number of the plural displayable image pages and the page position of the displayed image page can be easily understood.

Here, in a case in which the total number of the plural displayable image pages exceeds the predetermined value, the control section causes display of a strip-shaped second symbol, and also causes display of a second page indicator that specifies, on the second symbol, the page position of the displayed image page with respect to the total number of the plural displayable image pages.

As a result, even if the number of displayable image pages exceeds the predetermined value, the approximate total number of the plural displayable image pages and the approximate page position of the displayed image page can be easily understood, and the display of the page indicators is prevented from becoming complicated.

An image display control device according to a second aspect is the image display control device according to the first aspect, wherein, in a case in which the total number of the plural displayable image pages changes from being equal to or less than the predetermined value to exceeding the predetermined value, or in a case in which the total number of the plural displayable image pages changes from exceeding the predetermined value to being equal to or less than the predetermined value, the control section switches between the first page indicator and the second page indicator.

In the image display control device according to the second aspect, in a case in which the total number of the plural displayable image pages has changed and gone from being equal to or less than the predetermined value to exceeding the predetermined value, or in a case in which the total number of the plural displayable image pages has gone from exceeding the predetermined value to being equal to or less than the predetermined value, the first page indicator and the second page indicator are switched. As a result, the first page indicator and the second page indicator can be switched at an appropriate timing in response to a change in the total number of the plural displayable image pages.

An image display control device according to a third aspect is the image display control device according to the first aspect or the second aspect, wherein the display that displays the image page is a meter panel display that is installed at a vehicle.

In the image display control device according to the third aspect, an image page is displayed at a meter panel display installed at the vehicle. As a result, since the image page selected from the plural image pages can be displayed at the meter panel display, the display of the meter panel display can be prevented from becoming complicated, and an image page including required information can be displayed.

An image display control device according to a fourth aspect is any one of the image display control device according to the first aspect to the third aspect, wherein: a group of switches are arranged on a steering wheel of a vehicle, the group of switches including a switch associated with a function of switching an image page displayed at the display, among the plural displayable image pages; and the display control device causes display of an image of the group of switches at a display device that projects images onto a display region at a windshield glass.

In the image display control device according to the fourth aspect, a group of switches configured by plural switches is provided at a steering wheel of a vehicle, and a switch of the group of switches is associated with a function of switching an image page displayed at the display among the displayable image pages. Further, the image of the group of switches is displayed at a display device that projects images onto a display region at the windshield glass.

As a result, it is possible to perform operation of the switch associated with the function of switching image pages without shifting a line of sight to the group of switches provided at the steering wheel, and it is possible to safely perform switching of image pages to be displayed.

A image display control device according to a fifth aspect is the image display control device according to the fourth aspect, wherein the control section causes display of the first page indicator or the second page indicator at the display device that causes display of the image of the group of switches.

In the image display control device according to the fifth aspect, the first page indicator or the second page indicator is displayed at the display device that displays the image of the group of switches, thereby enabling the switching of image pages displayed at the display to be performed smoothly.

An image display control method according to a sixth aspect includes: causing any image page among plural displayable image pages to be displayed at a display, so as to: in a case in which a total number of the plural displayable image pages is equal to or less than a predetermined value, cause display of a same number of first symbols as the total number of the plural displayable image pages, and cause display of a first page indicator that specifies which first symbol among the first symbols is at a page position corresponding to an image page displayed at the display; and in a case in which the total number of the plural displayable image pages exceeds the predetermined value, cause display of a strip-shaped second symbol, and cause display of a second page indicator that specifies, on the second symbol, a page position of an image page displayed at the display, with respect to the total number of the plural displayable images.

In the image display control method according to the sixth aspect, in a similar manner to in the first aspect, even if the total number of the plural displayable image page exceeds the predetermined value, the approximate total number of the plural displayable image pages and the approximate page position of the displayed image page can be easily understood, and display of the page indicators is not complicated.

An image display control program according to a seventh aspect is executable by a computer to: cause any image page among plural displayable image pages to be displayed at a display, so as to: in a case in which a total number of the plural displayable image pages is equal to or less than a predetermined value, cause display of a same number of first symbols as the total number of the plural displayable image pages, and cause display of a first page indicator that specifies which first symbol among the first symbols is at a page position corresponding to an image page displayed at the display; and in a case in which the total number of the plural displayable image pages exceeds the predetermined value, cause display of a strip-shaped second symbol, and cause display of a second page indicator that specifies, on the second symbol, a page position of an image page displayed at the display, with respect to the total number of the plural displayable images.

In the image display control program according to the seventh aspect, in a similar manner to in the first aspect, even if the total number of the plural displayable image page exceeds the predetermined value, the approximate total number of the plural displayable image pages and the approximate page position of the displayed image page can be easily understood, and display of the page indicators is not complicated.

According to an aspect of the present disclosure, even if the total number of plural displayable image pages exceeds a predetermined value, the approximate total number of the plural displayable image pages and the approximate page position of the displayed image page can be easily understood, and display of the page indicators is not complicated.

DETAILED DESCRIPTION

Detailed explanation follows regarding exemplary embodiments of the present disclosure, with reference to the drawings.

Figure 1:
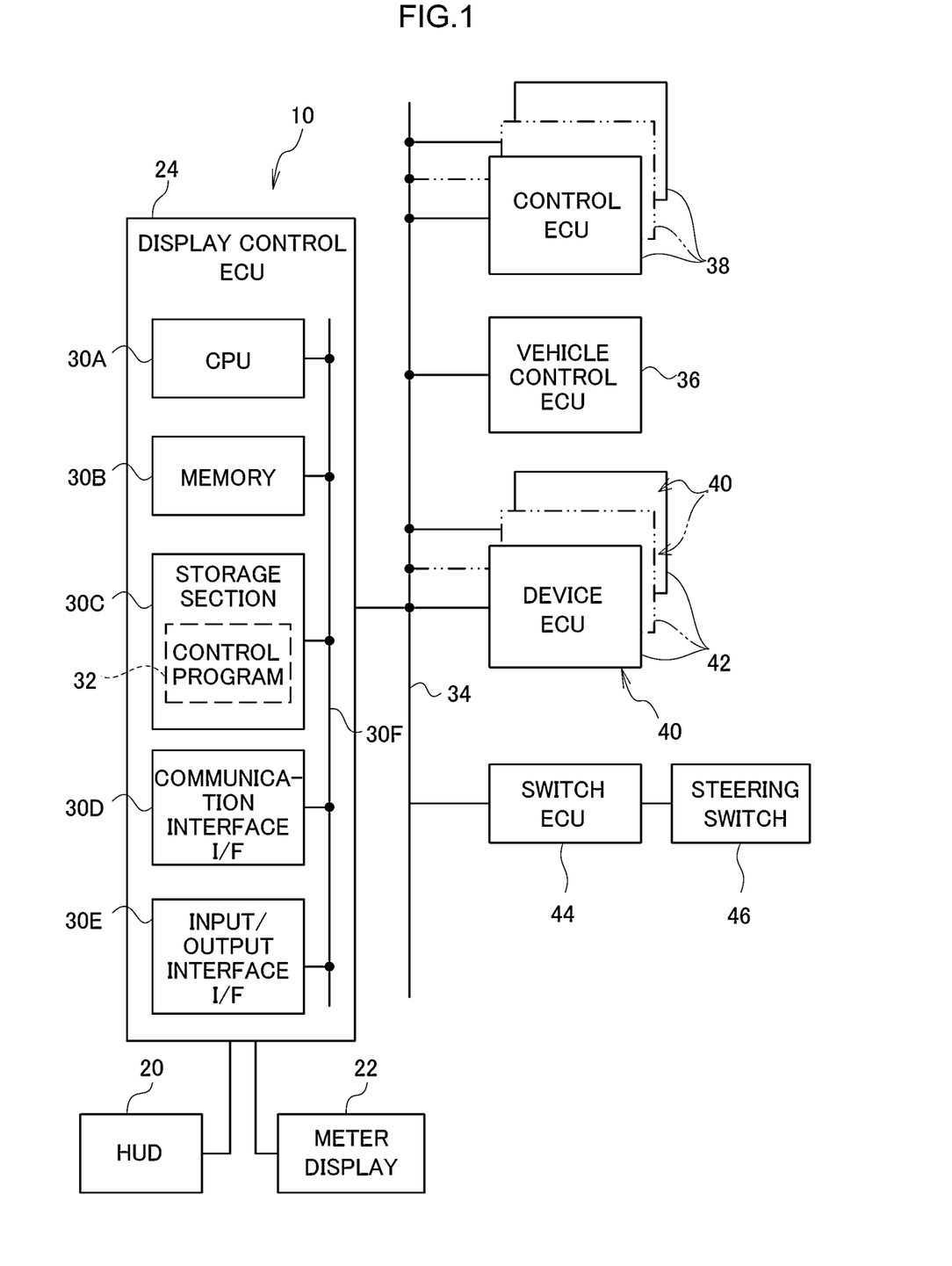
FIG. 1 is a block diagram of main sections illustrating a schematic configuration of a display control device according to the present exemplary embodiment.

A display control device 10 serving as an image display control device according to the present exemplary embodiment is provided at a vehicle 12, and displays various information regarding the vehicle 12 to inform an occupant (driver) of the various information regarding the vehicle 12. FIG. 1 is a block diagram illustrating a schematic configuration of the main sections of the display control device 10, and FIG. 2 is a front view illustrating a main section of inside a vehicle cabin as seen from an occupant (driver).

Figure 2:
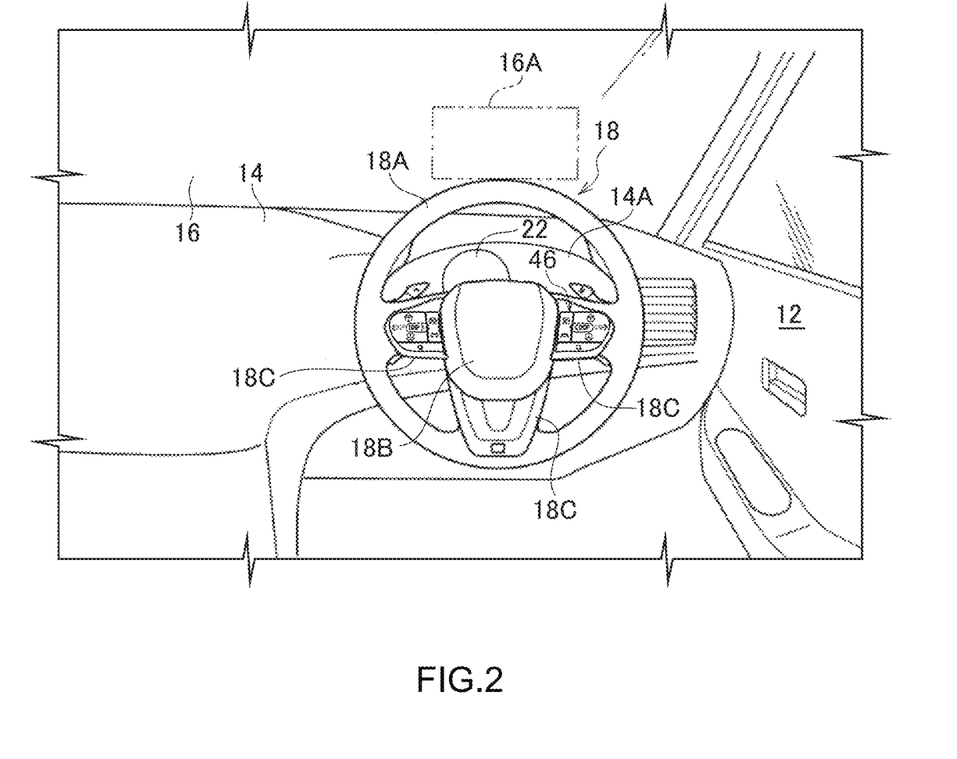
FIG. 2 is a schematic diagram of a main section of a vehicle.

As illustrated in FIG. 2, an instrument panel 14 is disposed in the vehicle 12 at a vehicle front side of a seat (a driver's seat) in which an occupant is seated inside the vehicle cabin. A windshield glass 16 is disposed at a vehicle front end of the instrument panel 14, and the windshield glass 16 extends in a vertical direction and a vehicle width direction so as to partition the vehicle cabin interior from an exterior of the vehicle cabin.

A steering shaft (not shown) with an axial direction in a vehicle front-rear direction is disposed at a vehicle front side of the vehicle cabin, and the steering shaft is supported rotatably by a vehicle body. Further, a steering wheel 18 is disposed at the vehicle front side of the driver's seat. The steering wheel 18 is integrated by connecting an annular rim portion 18A and a hub portion 18B disposed at a central portion of the rim portion 18A by spoke portions 18C.

The steering wheel 18 is supported rotatably by the vehicle body by the hub portion 18B being fixed to a vehicle rearward end of the steering shaft. In the vehicle 12, the steering shaft is rotated and steered by the steering wheel 18 (rim portion 18A) undergoing rotating operation. Further, a steering switch 46, which is described below, is disposed at a spoke portion 18C of the steering wheel 18, and the steering switch 46 is operable by an occupant. Note that FIG. 2 illustrates the steering wheel 18 in a state in which the vehicle is travelling straight ahead.

Figure 3:
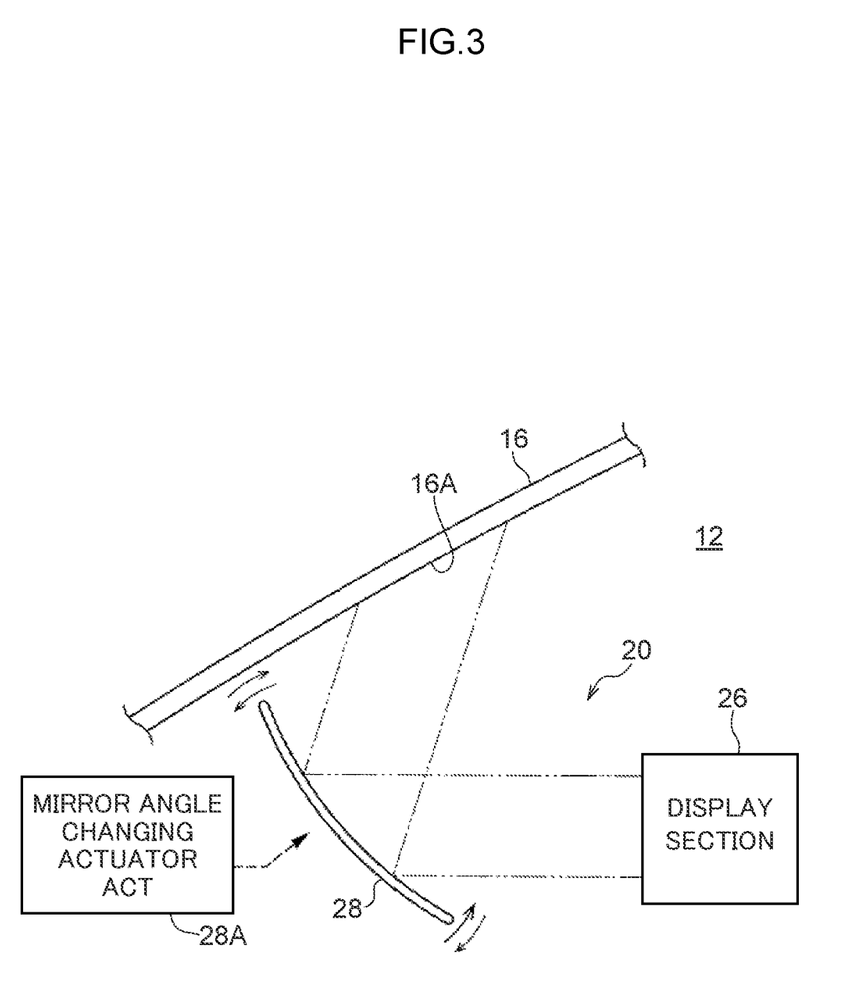
FIG. 3 is a schematic configuration diagram of an HUD.

As illustrated in FIG. 1, the display control device 10 includes a head-up display (HUD) 20, and a meter panel display (a display of a meter panel: hereinafter referred to as a meter display) 22, serving as the display device. Further, the display control device 10 includes a display control electronic control unit (ECU) 24, and the display control ECU 24 configures a control section that controls image display of each of the HUD 20 and the meter display 22. FIG. 3 is a schematic configuration diagram of the HUD 20.

As illustrated in FIG. 3, the HUD 20 includes a display section 26 that emits projection light for a display image, a mirror 28 that is configured by a concave mirror and that reflects and projects projection light emitted from the display section 26 onto the windshield glass 16, and a mirror angle changing actuator (ACT) 28A that changes a reflection angle of the mirror 28 with respect to the projection light.

As illustrated in FIG. 2 and FIG. 3, a display region 16A on which a display image is projected is set at the windshield glass 16, and the display region 16A is located at the vehicle front side of the driver's seat and at a lower side in the vertical direction of the windshield glass 16. As a result, the display region 16A is positioned such that a lower portion in the vehicle vertical direction overlaps with a hood (not shown) at a front part of the vehicle 12 as viewed from an occupant seated in the driver's seat.

The windshield glass 16 is given a half mirror treatment or the like at a vehicle cabin inner surface corresponding to the display region 16A. The windshield glass 16 enables an occupant to view a display image projected onto the display region 16A, and also enables an occupant to view landscape (scenery), a person (pedestrian), or the like, ahead of the vehicle, from inside the vehicle cabin. The HUD 20 irradiates projection light corresponding to image data from the display section 26 to the display region 16A of the windshield glass 16 so as to cause the windshield glass 16 to act as a display medium and display an image (projected image) corresponding to the image data.

As illustrated in FIG. 2, the meter display 22 is disposed at a meter panel 14A provided at the instrument panel 14 so as to be visible to an occupant seated in the driver's seat.

As illustrated in FIG. 1, the display control ECU 24 includes a central processing unit (CPU) 30A and memory 30B such as read only memory (ROM) and random access memory (RAM). Further, the display control ECU 24 includes a storage section 30C including non-volatile storage such as a hard disk drive (HDD) or a solid state drive (SSD), a communication interface (I/F) 30D, and an input/output interface (I/F) 30E. In the display control ECU 24, the CPU 30A, the memory 30B, the storage section 30C, the communication I/F 30D, and the input/output IF 30E are communicably connected to each other via an internal bus 30F.

The display control ECU 24 is connected to the HUD 20 and the meter display 22. Further, at the display control ECU 24, a control program 32 serving as an image display control program is stored at the storage section 30C. The display control ECU 24 implements functionality as a control section that controls display images of each of the HUD 20 and the meter display 22 by the CPU 30A reading the control program 32 from the storage section 30C and executing the control program 32 while loading the control program 32 in the memory (RAM) 30B.

The display control ECU 24 is connected to a system bus 34 provided at the vehicle 12. Further, a vehicle control ECU 36 that performs vehicle control including travel control is installed at the vehicle 12, and the vehicle control ECU 36 is connected to the system bus 34. Moreover, various control ECUs 38 are installed at the vehicle 12, including an engine ECU that performs engine control, a steering control ECU that performs steering control, a braking control ECU that performs braking control, and a shift control ECU that performs control of a transmission. The respective control ECUs 38 are connected to the system bus 34, and the respective control ECUs 38 operate in cooperation with the vehicle control ECU 36 to perform travel control of the vehicle 12.

Various onboard devices 40 such as an air conditioner, an audio system, a car navigation system, and a voice input system are installed at the vehicle 12. Further, the onboard devices 40 installed at the vehicle 12 include devices (travel assistance devices) for travel assistance, such as an adaptive cruise control (ACC) device and a lane tracing assist (LTA) device. Each onboard device 40 is provided with a device ECU 42 that controls respective operations, and each device ECU 42 is connected to the system bus 34.

Note that the ACC device implements a function (ACC function) to maintain a vehicle speed and a vehicle distance to a preceding vehicle as a travel assistance function, and the LTA device implements a function (lane maintaining function, LTA function) to cause a host vehicle (vehicle 12) to stay in a travel lane as a travel assistance function. Further, in the vehicle 12, the respective control ECUs 38, including the vehicle control ECU 36, and the device ECUs 42 of the ACC device the LTA device may operate in cooperation as driving assistance devices to implement driving assistance functionality to support driving operation of an occupant.

The vehicle 12 is provided with a switch ECU 44 serving as a selection means and a setting means, and the switch ECU 44 is connected to the system bus 34. A group of switches is connected to the switch ECU 44.

Figure 4:
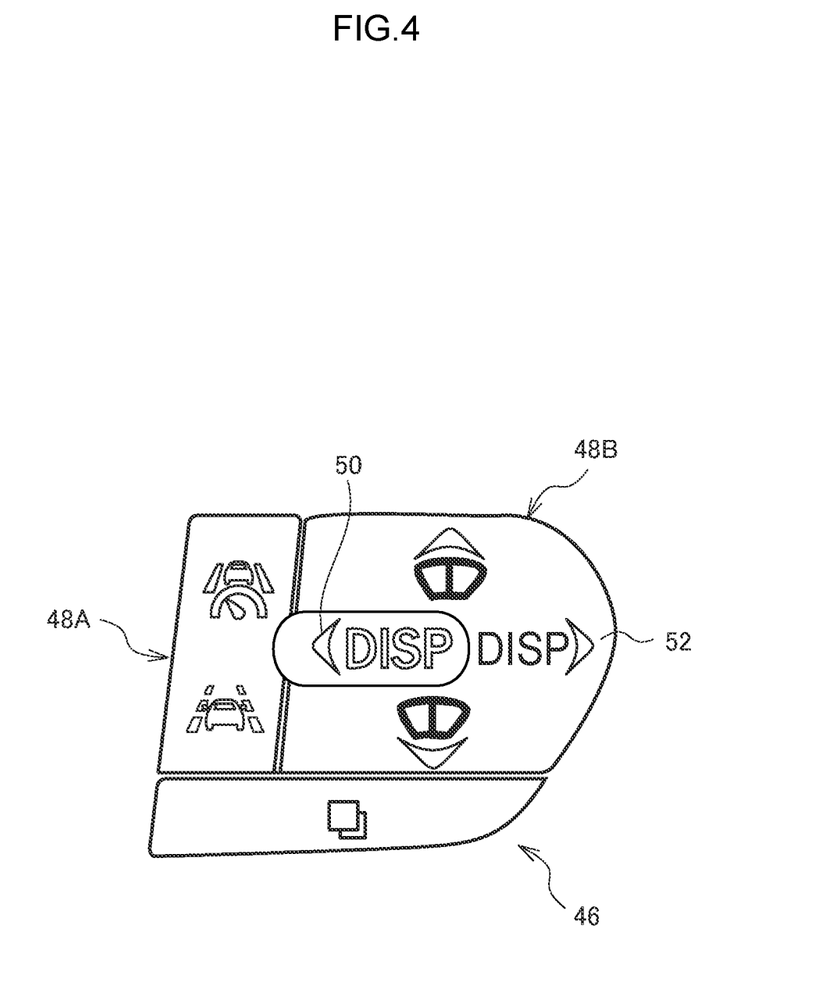
FIG. 4 is a schematic diagram illustrating an example of a steering switch.

As illustrated in FIG. 2, the steering wheel 18 is provided with a steering switch 46 that configures one group of switches. The steering switch 46 is installed at the spoke portion 18C of the steering wheel 18. FIG. 4 is a front view illustrating the main parts of the steering switch 46. Although the steering wheel 18 is provided with a steering switch at the spoke portion 18C at the right side of the hub portion 18B in the vehicle width direction and at the spoke portion 18C at the left side of the hub portion 18B in the vehicle width direction, in the present exemplary embodiment, the right side of the hub portion 18B in the vehicle width direction is explained as the steering switch 46, but the steering switch 46 may be configured so as to enable one of the right side in the vehicle width direction or the left side of the hub portion 18B in the vehicle width direction to be selected.

As illustrated in FIG. 4, the steering switch 46 includes a tactile switch 48A at the hub portion 18B side (corresponding to the left side of FIG. 4) and a tactile switch 48B at the rim portion 18A side (corresponding to the right side of FIG. 4), with the tactile switches 48A, 48B being of a contact detection type, for example.

In the present exemplary embodiment, the tactile switch 48B is a switch that is associated with switching between image pages, which are described below. The tactile switch 48A side of the tactile switch 48B is associated with the UP switch (previous page switch) 50, and the side of the tactile switch 48B that is opposite to the tactile switch 48A is associated with the DOWN switch (following page switch) 52.

In the vehicle 12, the respective control ECUs 38, including the vehicle control ECU 36, and the respective device ECUs 42 each monitor operating states of control targets. Further, when each ECU (the vehicle control ECU 36, each control ECU 38, and each device ECU 42) detects an event that is to be notified to an occupant of a control target, the ECU generates information or information images relating to the detected event, and outputs the generated information or information image to the display control ECU 24 via the system bus 34. Moreover, the switch ECU 44 detects operating states of the steering switch 46 (the UP switch 50 and the DOWN switch 52), and outputs the operating states to the display control ECU 24 via the system bus 34.

On the other hand, the display control ECU 24 acquires information according to the travel state and operating state of the vehicle 12 via the system bus 34, displays an image according to the acquired information at the meter display 22, and also displays the image at the display region 16A of the windshield glass 16 in the HUD 20. Note that in order to simplify the following explanation, image display of the display region 16A of the windshield glass 16 in the HUD 20 is explained as image display of the HUD 20. Further, in the present exemplary embodiment, as an example, the meter display 22 is used as a main image display section, and the HUD 20 is used as a sub image display section.

The display control ECU 24 sets the information displayed at the meter display 22 and the format of an image for displaying the information in a stationary state of the vehicle 12, and the display control ECU 24 sets plural image pages (for example, five pages) as images displayed at the meter display 22 in a stationary state.

Further, when the display control ECU 24 receives, from each ECU of the vehicle 12, information or information images relating to an event to be notified, the display control ECU 24 sets a new image page to be displayed at the meter display 22 based on the received information. The set image page is deleted at a predetermined timing such as a deletion request from the original ECU (for example, a deletion request due to an event to be notified being resolved and therefore unnecessary) or an elapsed time. As a result, the display control ECU 24 changes the image pages and the total number of pages being managed.

Figure 5A:
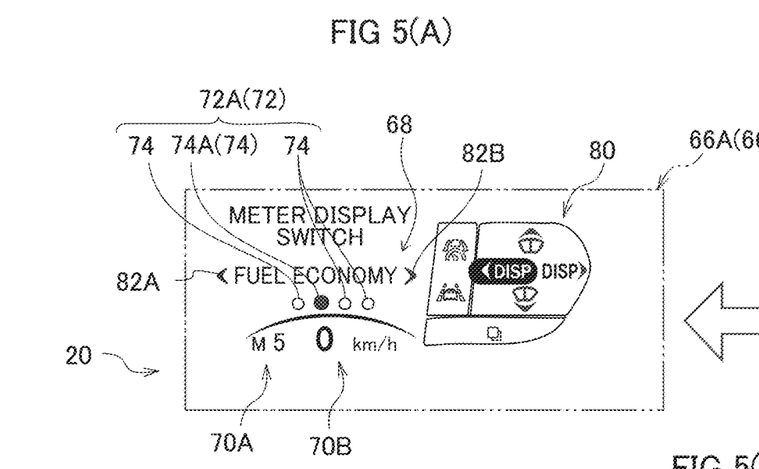
FIG. 5(A) and FIG. 5(B) are schematic diagrams respectively illustrating an example of an image displayed at an HUD, FIG. 5(A) illustrating a case in which the total number of pages is equal to or less than a predetermined value, FIG. 5(B) illustrating a case in which the total number of pages exceeds a predetermined value.
Figure 5B:
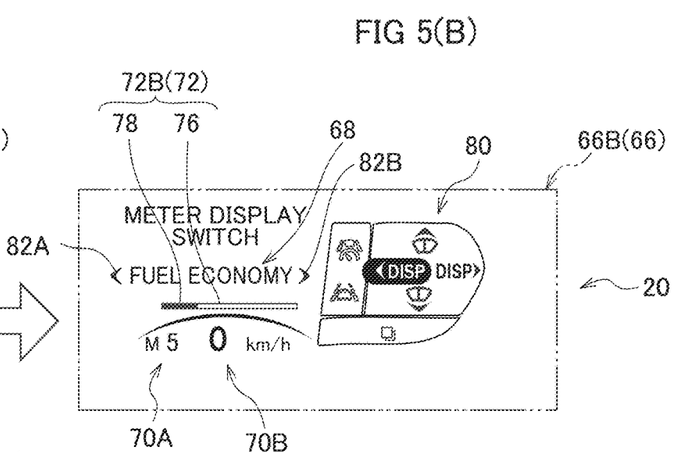

Further, the display control ECU 24 displays an image (an image including corresponding information), corresponding to an image (image page, information) displayed at the meter display 22, at the HUD 20. FIG. 5A and FIG. 5B are schematic diagrams illustrating an example of display at the HUD 20, and FIG. 5C is a schematic diagram illustrating an example of display at the meter display 22.

Figure 5C:
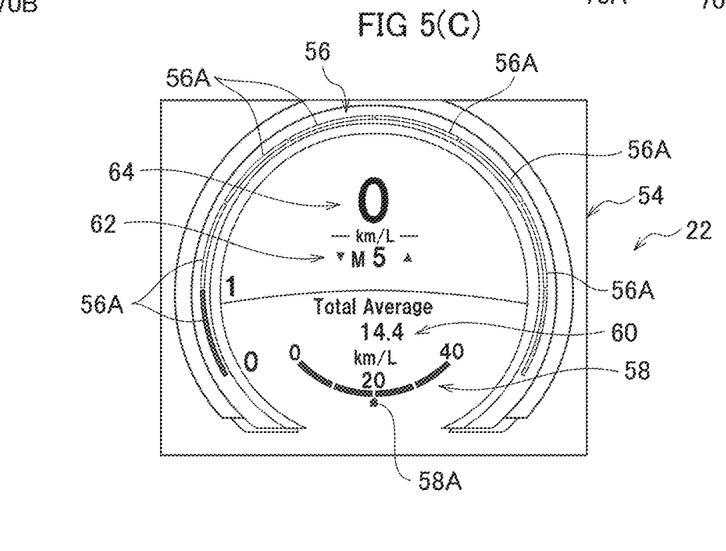
FIG. 5(C) is a schematic diagram illustrating an example of an image displayed at a meter display.

As illustrated in FIG. 5C, an image 54 (image page) displayed at the meter display 22 is substantially circular in shape. A tachometer image 56 is arranged around an outer periphery of the meter display 22 (image 54) in order to indicate the engine speed. The tachometer image 56 includes narrow scale bars 56 A, each having an arc shape, arranged in a circumferential direction, and seven scale bars 56A are arranged in a range from, for example, an 8 o'clock position to a 3 o'clock position in a clockwise direction. The scale bars 56A display the engine speed by setting the 8 o'clock position (the left end in the circumferential direction) to 0 rpm and changing color according to the engine speed. Note that 8 o'clock and 3 o'clock indicate directions corresponding to the short hand of a watch in a case in which the upper side of the image 54 is set to the 12 o'clock direction of the short hand of a watch and the lower side of the image 54 is set to the 6 o'clock direction of the short hand of a watch.

Further, in the image 54, a fuel meter image 58 indicating the amount (remaining amount) of fuel in the fuel tank is displayed at a lower portion. The fuel meter image 58 is arranged in an arc shape in a range from 4 o'clock to 8 o'clock radially inward of the scale bars 56A, and a triangular pointer 58A is displayed at the outer peripheral side of the fuel meter image 58. The pointer 58A is moved from the 4 o'clock position to the 8 o'clock position according to the remaining amount of fuel (in a case in which the fuel is decreasing).

In the image 54, the radially inner side of the fuel meter image 58 is the fuel economy display section 60, and the image 54 is an image page used for display of fuel economy. The numerical values of the fuel economy display section 60 are changed according to the calculated fuel economy.

Further, in the image 54, the center portion is a shift display section 62, and the shift position of the transmission is displayed at the shift display section 62, and the display is changed by the shift position of the transmission being changed. In addition, in the image 54, the upper side of the shift display section 62 is a speed display section 64, and the speed display section 64 displays numerical values according to the vehicle speed of the vehicle 12.

As illustrated in FIG. 5A and FIG. 5B, an image 66 corresponding to an image page of the meter display 22 is displayed at the HUD 20. The image 66 (images 66A, 66B) of the HUD 20 corresponding to the image at the meter display 22 includes a display section 68 indicating that the image page is an image page of fuel economy information. The display section 68 changes display according to the switched image page by switching the image page displayed at the meter display 22.

Further, in each of the images 66A, 66B, a shift display section 70A indicating a shift position and a vehicle speed display section 70B indicating a vehicle speed are arranged at a lower portion of the display section 68. The display of the shift display section 70A is changed by changing the shift range. Further, the display of the vehicle speed display section 70B is changed according to the vehicle speed of the vehicle 12.

The HUD 20 displays a page indicator 72 that is information indicating the position of the image page displayed at the meter display 22 among the total number of image pages (total page number). The display control ECU 24 sets plural page indicators 72 according to the total page number of image pages, and at the display control ECU 24, page indicators 72 are made to differ between a case in which the total page number of image pages is relatively small and a case in which the total page number of image pages is relatively large.

For example, the display control ECU 24 is set with a predetermined value Nth serving as a threshold value for the total page number N of image pages. The page indicator 72 is set as a page indicator 72A (see FIG. 5A) serving as a first page indicator that is used in a case in which the total page number N is equal to or less than the predetermined value Nth (N≤Nth), and as a page indicator 72B (see FIG. 5B) serving as a second page indicator that is used in a case in which the total page number N exceeds the predetermined value Nth (N>Nth).

As illustrated in FIG. 5A, the page indicator 72A uses dots 74 as first symbols, and the number of dots 74 arranged in the page indicator 72A is the same as the total page number N of image pages. Further, in the page indicator 72A, a dot 74A, which corresponds to the page position of the image page displayed at the meter display 22 with respect to the total number of pages, is displayed so as to be different from the other dots 74. For example, in a case in which the total page number N of image pages is four pages and the second image page is displayed at the meter display 22, the second dot from the left in the page indicator 72A is the dot 74A.

A circular shape can be applied to the dots 74 (including the dot 74A) of the page indicator 72A: however, there is no limitation to a circular shape, and a polygon such as a quadrangle may be applied. Further, the dot 74A need only be clearly different from the other dots 74, and the size (diameter) of the dot 74A may be large, or the dot 74A may be brighter than the other dots 74. Further, the page indicator 72A may have a color in which the dot 74A is different from the other dots 74.

In a case in which the page indicator 72A is used, as the number of dots 74 increases, it becomes difficult to understand the number of dots. From here, as an example, the display control ECU 24 sets the predetermined value Nth as 5. Due thereto, at the page indicator 72A, the number of dots 74 can be understood at a glance as five even if the number of dots 74 is the largest number. Further, the display control ECU 24 sets the number of image pages in a stationary state to five pages, and also in consideration of this point, sets the predetermined value Nth as 5.

As illustrated in FIG. 5B, a strip-shaped scroll bar 76 is used as a second symbol in the page indicator 72B, and a cursor 78 is arranged at the scroll bar 76. The position of the cursor 78 is set to a position corresponding to the page position of the image page displayed at the meter display 22 with respect to the total number of image pages. Accordingly, in a case in which the first image page is displayed at the meter display 22, the cursor 78 is arranged at the left end position of the scroll bar 76, while in a case in which the last image page is displayed at the meter display 22, the cursor 78 is arranged at the right end position of the scroll bar 76.

Such a cursor 78 may be made smaller (shorter) as the total number of pages increases, for example, enabling an approximate understanding of the total number of pages even if the total number of image pages increases.

The specified position (the dot 74A or the cursor 78) is moved at the page indicators 72 (72A, 72B) by the UP switch 50 and the DOWN switch 52 being operated and the image page displayed at the meter display 22 being changed.

Further, as illustrated in FIG. 5A and FIG. 5B, a switch image 80 corresponding to the steering switch 46, to which the UP switch 50 and the DOWN switch 52 are associated, is displayed at the images 66A, 66B displayed at the HUD 20. The steering switch 46 at the right side of the steering wheel 18 is applied to the UP switch 50 and the DOWN switch 52, and the switch image 80 is arranged at the right side in the vehicle width direction in each of the images 66A, 66B.

Note that the page indicators 72 (72A, 72B) may display a left arrow 82A at the left side (the left side in the vehicle width direction) of the display section 68, and may include a right arrow 82B at the right side (the right side in the vehicle width direction) of the display section 68. The left arrow 82A is set in a non-display state by displaying the first image page at the meter display 22. Further, the right arrow 82B is set in a non-display state by displaying the last image page at the meter display 22.

Figure 6:
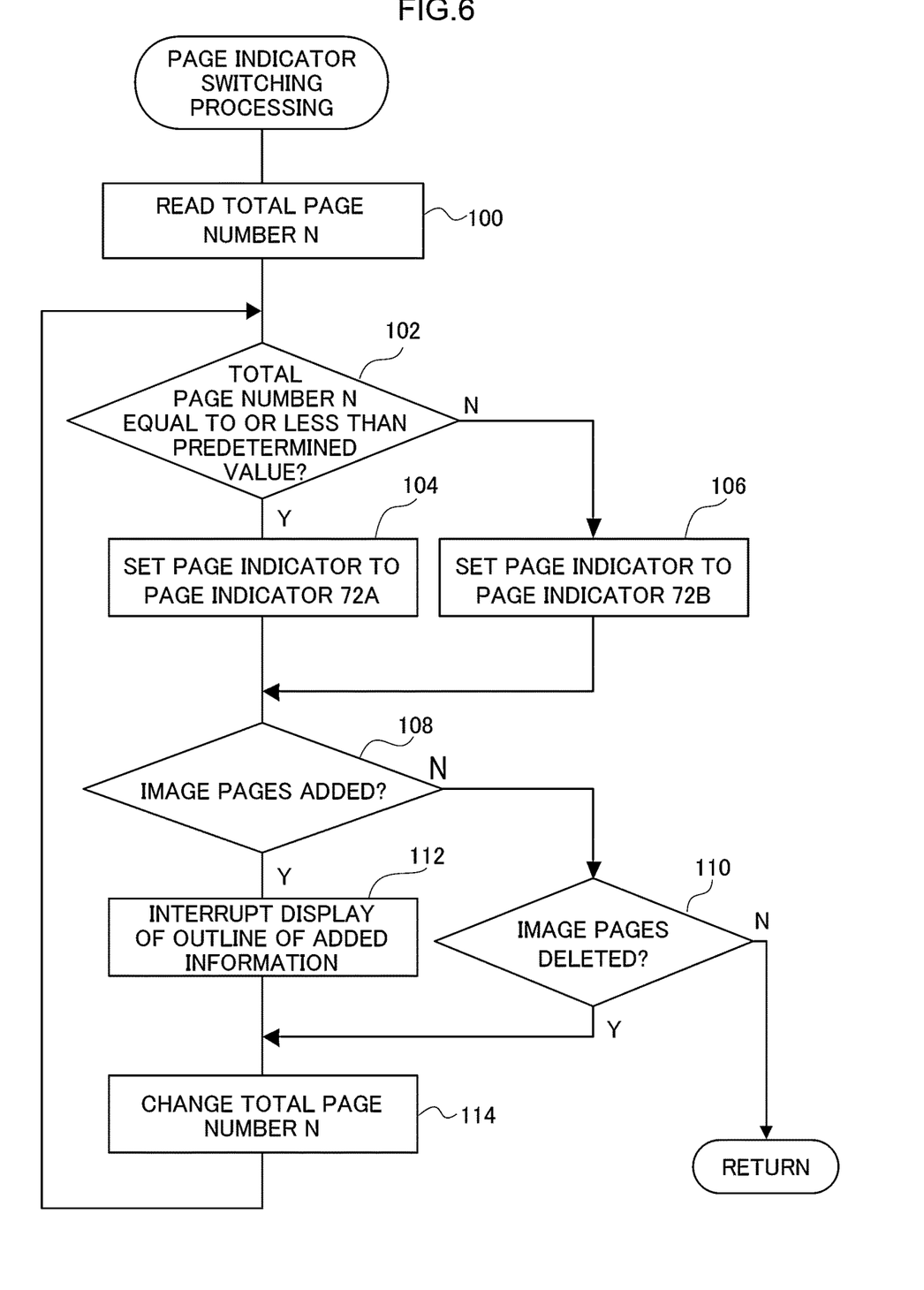
FIG. 6 is a flowchart illustrating an example of page indicator switching processing.

Next, explanation follows regarding page indicator switching processing that is executed by the display control ECU 24. FIG. 6 is a flowchart illustrating an example of page indicator switching processing that is executed by the display control ECU 24.

The display control ECU 24 is set with a predetermined number of image pages (image pages in a stationary state), and performs addition of image pages and deletion of added image pages according to the travel state of the vehicle 12. The display control ECU 24 switches the page indicator 72 displayed at the HUD 20 according to the total page number N of image pages that changes in response to addition or deletion.

As illustrated in FIG. 6, at a first step 100, the display control ECU 24 reads the total page number N of image pages, and at a next step 102, checks whether or not the total page number N of image pages is equal to or less than the predetermined value Nth.

Here, when the total page number N is equal to or less than the predetermined value Nth (N≤N), the display control ECU 24 makes an affirmative determination at step 102, and the processing transitions to step 104. At step 104, the display control ECU 24 sets the page indicator 72 to the page indicator 72A. As a result, as illustrated in FIG. 5A, the same number of dots 74 as the total page number N is displayed at the HUD 20, and the dot 74A corresponding to the position of the image pages displayed on the meter display 22 is specified.

Further, in a case in which the total page number N exceeds the predetermined value Nth (N>Nth), the display control ECU 24 makes a negative determination at step 102 in FIG. 6, and the processing transitions to step 106. At step 106, the display control ECU 24 sets the page indicator 72 to the page indicator 72B. As a result, as illustrated in FIG. 5B, the scroll bar 76 is displayed at the HUD 20, and the cursor 78 is displayed on the scroll bar 76 at a position corresponding to the position of the image page displayed at the meter display 22.

At step 108, the display control ECU 24 checks whether or not a new image page has been generated and added. Further, at step 110, the display control ECU 24 checks whether or not any image pages have been deleted.

The display control ECU 24 generates a new image page to be displayed at the meter display 22 when receiving information or the like to be notified to an occupant from any of the ECUs. As a result, when an image page is added, the display control ECU 24 makes an affirmative determination at step 108, and the processing transitions to step 112.

At step 112, the display control ECU 24 performs an interrupt display to display, at the HUD 20 or the meter display 22, an image schematically illustrating information included in the newly generated image page. In the interruption display, the display control ECU 24 displays an image that outlines the information included in the newly generated image page, superimposed at the image displayed at the HUD 20 or superimposed at the image displayed on the meter display 22, for a predetermined period of time.

Figure 7:
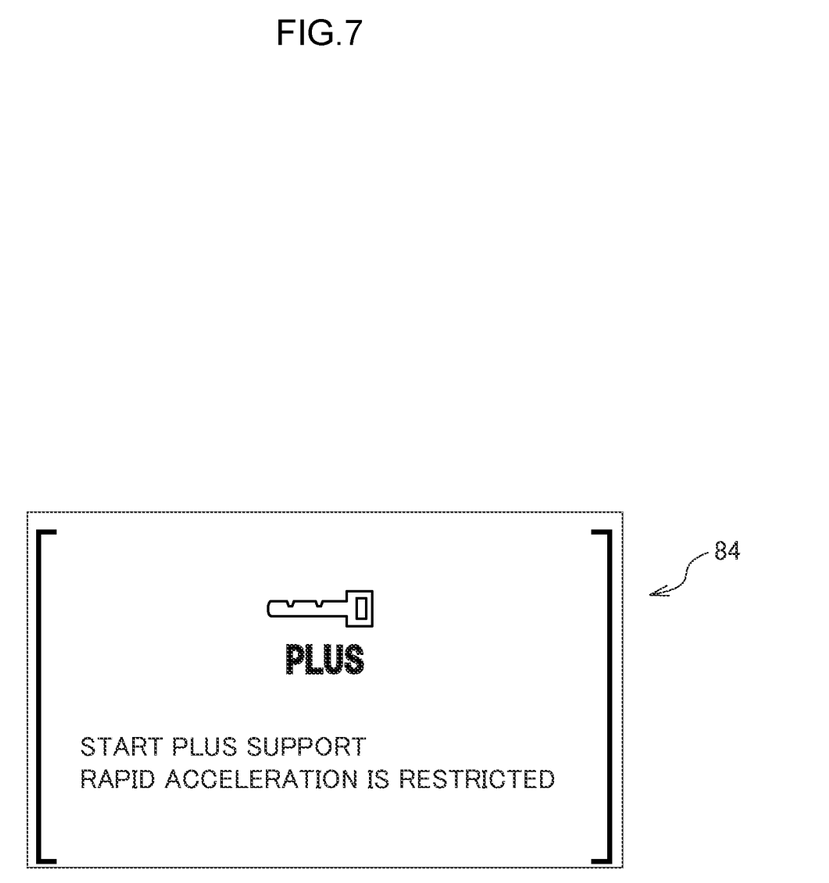
FIG. 7 is a schematic diagram illustrating an example of an interrupt image.

FIG. 7 is a schematic diagram illustrating an example of an image schematically illustrating information included in a newly generated image page. The image 84 illustrated in FIG. 7 provides notification that rapid acceleration is restricted because an abnormality in the travel state of the vehicle 12 has been detected.

When the display control ECU 24 displays the image 84 or the like for a predetermined period of time, the processing transitions to step 114 in FIG. 6 to update the total page number N of image pages, after which the processing transitions to step 102. As a result, when the total page number N of image pages increases and exceeds the predetermined value Nth, the page indicator 72 displayed at the HUD 20 is switched from the page indicator 72A to the page indicator 72B.

In contrast, the display control ECU 24 deletes the added image pages at a predetermined timing. As a result, the display control ECU 24 makes a negative determination at step 108, makes an affirmative determination at step 110, and the processing transitions to step 114.

At step 114, the display control ECU 24 updates the total page number N of image pages, after which the processing transitions to step 102. As a result, the total page number N of image pages, which had exceeded the predetermined value Nth, becomes equal to or less than the predetermined value Nth, so that the page indicator 72 displayed at the HUD 20 is switched from the page indicator 72B to the page indicator 72A.

In this manner, when displaying the page indicator 72 according to the total page number N of image pages that can be displayed at the meter display 22, the display control device 10 displays the page indicator 72A in a case in which the total page number N is equal to or less than the predetermined value Nth, and displays the page indicator 72B in a case in which the total page number N exceeds the predetermined value Nth.

The page indicator 72A displays the same number of dots 74 as the total page number N and also displays the dot 74A, thereby enabling the total page number N and the position of the image page displayed at the meter display 22 to be visually and accurately recognized (understood). Further, since the page indicator 72B displays the cursor 78 on the scroll bar 76 according to the position of the image page displayed at the meter display 22, the total page number N and the position of the image page displayed at the meter display 22 can be visually recognized easily, and therefore, display of the page indicator is not complicated even if the total number of image pages is large.

Further, when the total page number N of image pages has changed, the display control device 10 dynamically performs change from the page indicator 72A to the page indicator 72B and change from the page indicator 72B to the page indicator 72A in response to the change in the total page number N. This enables the display control device 10 to only change the page indicator 72, thereby preventing an occupant from a troublesome feeling with respect to switching of the page indicator 72.

Further, since the display control device 10 can display each image of the plural image pages at the meter display 22 of the vehicle 12 while switching, desired information can be presented to an occupant who drives and operates the vehicle 12.

In addition, the display control device 10 associates functionality of switching image pages to the steering switch 46 of the steering wheel 18 of the vehicle 12, and also displays the switch image 80 using the HUD 20. This enables an occupant to switch between image pages without shifting their line of sight to the steering switch 46 of the steering wheel 18, and thereby enables the image (image page) displayed at the meter display 22 to be switched safely.

Further, since the switch image 80 is displayed at the HUD 20 together with the page indicator 72, the display control device 10 can smoothly switch between images displayed at the meter display 22. Note that although the page indicator 72 (72A, 72B) is displayed at the HUD 20 in the present exemplary embodiment, the page indicator 72 may be displayed at a display other than the HUD 20, such as the meter display 22. Namely, the first page indicator and the second page indicator may be displayed at the display together with an image corresponding to an image page.

Further, in the present exemplary embodiment, explanation has been given regarding an example of the page indicators 72 (72A, 72B) for image pages displayed at the meter display 22. However, the present disclosure may be applied to a page indicator for an image page to be displayed at the HUD 20.

Further, in the present exemplary embodiment described above, an example of the vehicle 12 including an engine (a reciprocating engine) as a driving source for travel has been described. However, the vehicle may be any of a hybrid electric vehicle (HEV), a plug-in hybrid electric vehicle (PHEV), a fuel cell electric vehicle (FCEV), a battery electric vehicle (BEV), or the like. The image display control device may be any device that performs display set according to the vehicle to which it is installed.

Further, in the present exemplary embodiment, an example of the display control device 10 installed at the vehicle 12 has been described. However, the image display control device may be applied to a display device that switches and displays plural image pages in a place other than a vehicle.

Further, in the present exemplary embodiment, the control program 32 serving as the vehicle display control program is stored (installed) in advance in the storage section 30C. However, the vehicle display control program may be provided in a format recorded on a recording medium such as compact disc read only memory (CD-ROM), digital versatile disc read only memory (DVD-ROM), or universal serial bus (USB) memory. Further, the vehicle display control program may be provided in a format downloadable from an external device via a network.

What is claimed is:

1. An image display control device comprising:
    an Electronic Control Unit including a processor that is configured to cause any image page among a plurality of displayable image pages to be displayed at a meter panel display that is installed at an instrument panel of a vehicle; and
    a head-up display (HUD) configured to project images onto a display region of a windshield glass of the vehicle,
    wherein the processor of the Electronic Control Unit is further configured to:
    (a) in a case in which a total number of the plurality of displayable image pages is equal to or less than a predetermined value, (a1) cause the HUD to display a first page indicator onto the display region of the windshield glass of the vehicle, the first page indicator including a same number of first symbols as the total number of the plurality of displayable image pages, and (a2) cause one of the first symbols that is at a page position corresponding to an image page displayed at the meter panel display to be displayed in a manner different from a manner in which remaining ones of the first symbols are displayed; and (b) in a case in which the total number of the plurality of displayable image pages exceeds the predetermined value, (b1) cause the HUD to display a second page indicator onto the display region of the windshield glass of the vehicle instead of causing the first page indicator having the first symbols to be displayed onto the display region of the windshield glass of the vehicle, the second page indicator including a strip-shaped second symbol, and (b2) cause display of a marking that specifies, on the strip-shaped second symbol, the page position of the image page displayed at the meter panel display, with respect to the total number of the plurality of displayable image pages.

2. The image display control device according to claim 1, wherein the processor of the Electronic Control Unit is further configured to, in a case in which the total number of the plurality of displayable image pages changes from being equal to or less than the predetermined value to exceeding the predetermined value, or in a case in which the total number of the plurality of displayable image pages changes from exceeding the predetermined value to being equal to or less than the predetermined value, switch between causing display of the first page indicator and the second page indicator by the HUD.

3. The image display control device according to claim 2, wherein:
a group of switches is arranged on a steering wheel of the vehicle, the group of switches including a switch associated with a function of switching an image page displayed at the meter panel display, among the plurality of displayable image pages; and
the processor of the Electronic Control Unit is further configured to cause the HUD to display an image of the group of switches onto the display region of the windshield glass of the vehicle.

4. The image display control device according to claim 1, wherein:
a group of switches is arranged on a steering wheel of the vehicle, the group of switches including a switch associated with a function of switching an image page displayed at the meter panel display, among the plurality of displayable image pages; and
the processor of the Electronic Control Unit is further configured to cause the HUD to display an image of the group of switches onto the display region of the windshield glass of the vehicle.

5. An image display control method executed by an Electronic Control Unit including a processor, the method comprising:
causing, by the processor, any image page among a plurality of displayable image pages to be displayed at a meter panel display that is installed at an instrument panel of a vehicle; and
causing, by the processor, either a first page indicator or a second page indicator to be displayed by a head-up display (HUD) configured to project images onto a display region of a windshield glass of the vehicle,
wherein the method further comprises:

(a) when a total number of the plurality of displayable image pages is equal to or less than a predetermined value, (a1) causing the HUD to display the first page indicator onto the display region of the windshield glass of the vehicle, the first page indicator including a same number of first symbols as the total number of the plurality of displayable image pages, and (a2) causing one of the first symbols that is at a page position corresponding to an image page displayed at the meter panel display to be displayed in a manner different from a manner in which remaining ones of the first symbols are displayed; and (b) when the total number of the plurality of displayable image pages exceeds the predetermined value, (b1) causing the HUD to display the second page indicator onto the display region of the windshield glass of the vehicle instead of causing the first page indicator having the first symbols to be displayed onto the display region of the windshield glass of the vehicle, the second page indicator including a strip-shaped second symbol, and (b2) causing display of a marking that specifies, on the strip-shaped second symbol, the page position of the image page displayed at the meter panel display, with respect to the total number of the plurality of displayable image pages.

6. A non-transitory computer-readable storage medium storing on which is stored a display control program that, when executed by a computer, causes the computer to perform operations comprising:
causing any image page among a plurality of displayable image pages to be displayed at a meter panel display that is installed at an instrument panel of a vehicle; and
causing either a first page indicator or a second page indicator to be displayed by a head-up display (HUD) configured to project images onto a display region of a windshield glass of the vehicle,
wherein the operations further comprise:

(a) in a case in which a total number of the plurality of displayable image pages is equal to or less than a predetermined value, (a1) causing the HUD to display the first page indicator onto the display region of the windshield glass of the vehicle, the first page indicator including a same number of first symbols as the total number of the plurality of displayable image pages, and (a2) causing one of the first symbols that is at a page position corresponding to an image page displayed at the meter panel display to be displayed in a manner different from a manner in which remaining ones of the first symbols are displayed; and (b) in a case in which the total number of the plurality of displayable image pages exceeds the predetermined value, (b1) causing the HUD to display the second page indicator onto the display region of the windshield glass of the vehicle instead of causing the first page indicator having the first symbols to be displayed onto the display region of the windshield glass of the vehicle, the second page indicator including a strip-shaped second symbol, and (b2) causing display of a marking that specifies, on the strip-shaped second symbol, the page position of the image page displayed at the meter panel display, with respect to the total number of the plurality of displayable image pages.

* * * * *